(12) United States Patent  
Kuo et al.

(10) Patent No.: US 8,146,648 B2
(45) Date of Patent: Apr. 3, 2012

(54) APPARATUS FOR FORMING ELECTRODE HEADS

(76) Inventors: Lung Kuo, Taipei (TW); Chia-Shou Kuo, Taipei (TW)

( * ) Notice: Subject to any disclaimer, the term of this patent is extended or adjusted under 35 U.S.C. 154(b) by 0 days.

(21) Appl. No.: 12/984,097

(22) Filed: Jan. 4, 2011

(65) Prior Publication Data

US 2011/0259542 A1 Oct. 27, 2011

(30) Foreign Application Priority Data

Apr. 23, 2010 (TW) ............................... 99207497 U

(51) Int. Cl.
*B22D 19/00* (2006.01)
*H01M 10/14* (2006.01)

(52) U.S. Cl. ........................ 164/332; 164/322; 29/730
(58) Field of Classification Search .......... 164/129–130, 164/165–166, 409, 322, 332; 29/730–731
See application file for complete search history.

(56) References Cited

U.S. PATENT DOCUMENTS

| | | | | |
|---|---|---|---|---|
| 3,859,134 A | * | 1/1975 | Shirodker | 429/211 |
| 4,573,514 A | * | 3/1986 | Wolf et al. | 164/4.1 |
| 5,505,744 A | * | 4/1996 | Eberle et al. | 29/623.4 |
| 2007/0266553 A1 | * | 11/2007 | Schlogl | 29/623.1 |

* cited by examiner

*Primary Examiner* — Jessica L Ward
*Assistant Examiner* — Jacky Yuen
(74) *Attorney, Agent, or Firm* — Rabin & Berdo, P.C.

(57) ABSTRACT

An apparatus for forming electrode heads includes a first and second lost-wax areas; a first and second electrode head forming areas; and a first, second and third transfer units. The first transfer unit rotates an electrode plate group from a horizontal to a vertical orientation. The second transfer unit holds the electrode plate group oriented vertically, and delivers it to be dipped in wax in the first lost-wax area, and then delivers the wax dipped electrode plate group to the first electrode head forming area to form one electrode head on one end thereof. The third transfer unit rotates the electrode plate group with the first electrode head, and delivers it to be dipped in wax in the second lost-wax area, and then delivers the wax dipped electrode plate group with the first electrode head to the second electrode head forming area to form another electrode head on thereof.

1 Claim, 12 Drawing Sheets

APPARATUS FOR FORMING ELECTRODE HEADS

BACKGROUND OF THE INVENTION

1. Field of the Invention

The present invention relates to an apparatus for automatically and quickly forming electrode heads on an electrode plate group of a horizontal battery.

2. The Prior Arts

The conventional sealed lead-acid batteries have the following shortcomings:

(1) The gird is made by pouring molten lead ingots into a mold, and however, material consumption is relatively high by using this process.
(2) If the electrode plates are vertically arranged, the electrolyte stratification will occur.
(3) The electrode plates are secured in place by the fixing rods disposed on the two sides of the electrolysis tank, and however, the active substances of the electrode plates easily drop off due to impact and vibration.
(4) The manufacturing processes involve repeatedly drying and maturing steps so that it requires a longer period to complete the processes, and the longer period delays the capital flow and increases the waiting period of the products in the market.
(5) The grid is made of solid lead alloy, and the lead ingots for the proper series and/or parallel connections of the electrodes are required, and thereby material consumption is relatively high.
(6) Lead vapor is released in the process of melting lead ingots, which can pollute the environment when ventilation is not adequate.
(7) The ratio of the energy output of a battery to its weight (33 wh/kg) is low, and the battery cycle life is only about 300 cycles due to the anti-vibration structure of the battery, and the battery charge time is too long which requires about 6 to 8 hours.

The horizontal lead-acid batteries are developed for improving the shortcomings of the conventional vertical batteries. Strings of glass fiber are wrapped into a core of a horizontally lead-acid battery, and a layer of lead alloy is coated on the outside of the core by cold extrusion to form a lead string. The lead strings are then woven into a lead grid. A new lead paste is produced without the maturity stage, and the positive electrode and the negative electrode lead pastes are respectively coated on the lead grid according to the desired battery structure. In order to secure the active substances on the electrode plates, a sheet of specific paper is attached to the two sides of the electrode plate, and then dried and wrapped with the specific fine glass cottons, and then the electrode plates are assembled and used in a lead acid battery. The lead acid battery is then sealed, followed by filling acid, forming, filling curing agent, cleaning and packing. After that, the process for manufacturing the horizontal lead acid battery is completed.

Because the electrode plates are horizontally arranged, the concentration polarization, which is due to the concentration difference which develop at the anode and cathode during electrolysis, can be eliminated, and the concentration polarization is one of the main reasons why the capacity and the lifetime of the batteries are reduced.

The internal resistance of the horizontal lead acid batteries is small because the positive and negative electrodes are directly in contact with each other so that the active substance can be used uniformly. The lead ingots used for connecting batteries in parallel are saved. The high current electrical discharge and voltage drop become small.

The lead net replaces the conventional grid so that the weight of the batteries is reduced, and the material consumption is relatively low. The ratio of the energy output of a battery to its weight (40 wh/kg) is greatly increased, and the charge acceptance of lead acid battery is increased so that the charging time is shortened.

Because the lead net has good tensile strength, the active substances on the electrode plates can allow large strain deformation, and thereby the battery cycle life is increased.

The positive electrode head and the negative electrode head are disposed on two ends of the electrode plate group of the horizontal battery by casting. In the conventional method, the electrode plate groups are moved to the casting machine manually, and the first electrode head is formed on one end of the electrode plate group, and the electrode plate group is then rotated to another direction, and then the second electrode head is formed on another end of the electrode plate group. However, the volume and the weight of the horizontal batteries are larger and heavier than those of the conventional vertical lead acid batteries, so that the efficiency of operation is low.

SUMMARY OF THE INVENTION

A primary objective of the present invention is to provide an apparatus for automatically and quickly forming electrode heads on an electrode plate group of a horizontal battery.

In the apparatus for forming electrode heads of the present invention, the electrode plate group is turned from the horizontal orientation to the vertical orientation by the first transfer unit, and the second transfer unit holds the electrode plate group oriented vertically, and delivered it to the first area to dip the wax, and then moves the electrode plate group dipped with wax to the first electrode head forming area to form a first electrode head on one end of the electrode plate group. The third transfer unit holds the electrode plate group with the first electrode head formed thereon and turns it around, and delivers the electrode plate group with the first electrode head formed thereon to the second area to dip the wax, and then delivers the wax dipped electrode plate group with the first electrode head formed thereon to the second electrode head forming area to form a second electrode head on the electrode plate group with the first electrode head. Therefore, by utilizing the apparatus for forming electrode heads of the present invention, the electrode heads can be automatically and quickly formed on two ends of an electrode plate group of a horizontal battery.

The apparatus for forming electrode heads of the present invention comprises: a first area provided with a first container containing wax; a first electrode head forming area provided with a plurality of first casting molds, and provided following the first area to perform a post-processing process to an electrode plate group from the first wax area; a second area provided with a second container containing wax; a second electrode head forming area provided with a plurality of second casting molds, and provided following the second area to perform a post-processing process to the electrode plate group from the second area; a first transfer unit provided with a first clamper which holds the electrode plate group and turns it around; a second transfer unit provided with a second clamper, and delivers the turned electrode plate group from the first transfer unit to the first area to dip the wax, and the electrode plate group dipped with the wax is delivered to the first electrode head forming area and enters one of the first casting molds to form a first electrode head on the electrode plate group, and a third transfer unit provided with a third clamper which holds the electrode plate group with the first electrode head formed thereon and turns it around, and the third transfer unit delivers the electrode plate group with the first electrode head formed thereon to the second area to dip the wax, and then the wax dipped electrode plate group with the first electrode head formed thereon is delivered to the second electrode head forming area and enters one of the second casting molds to form a second electrode head on the electrode plate group with the first electrode head formed thereon.

The first transfer unit can be a mechanical arm, or a pneumatic cylinder used together with a rotary cylinder and a clamper.

The second transfer unit can be a mechanical arm, or a track conveyor used together with a pneumatic cylinder and a clamper.

The third transfer unit can be a mechanical arm, or a track conveyor used together with a pneumatic cylinder, a rotary cylinder and a clamper.

BRIEF DESCTRIPTION OF THE DRAWINGS

The present invention will be apparent to those skilled in the art by reading the following detailed description of a preferred embodiment thereof, with reference to the attached drawings.

DETAILED DESCRIPTION OF THE PREFERRED EMBODIMENT

Figure 1:
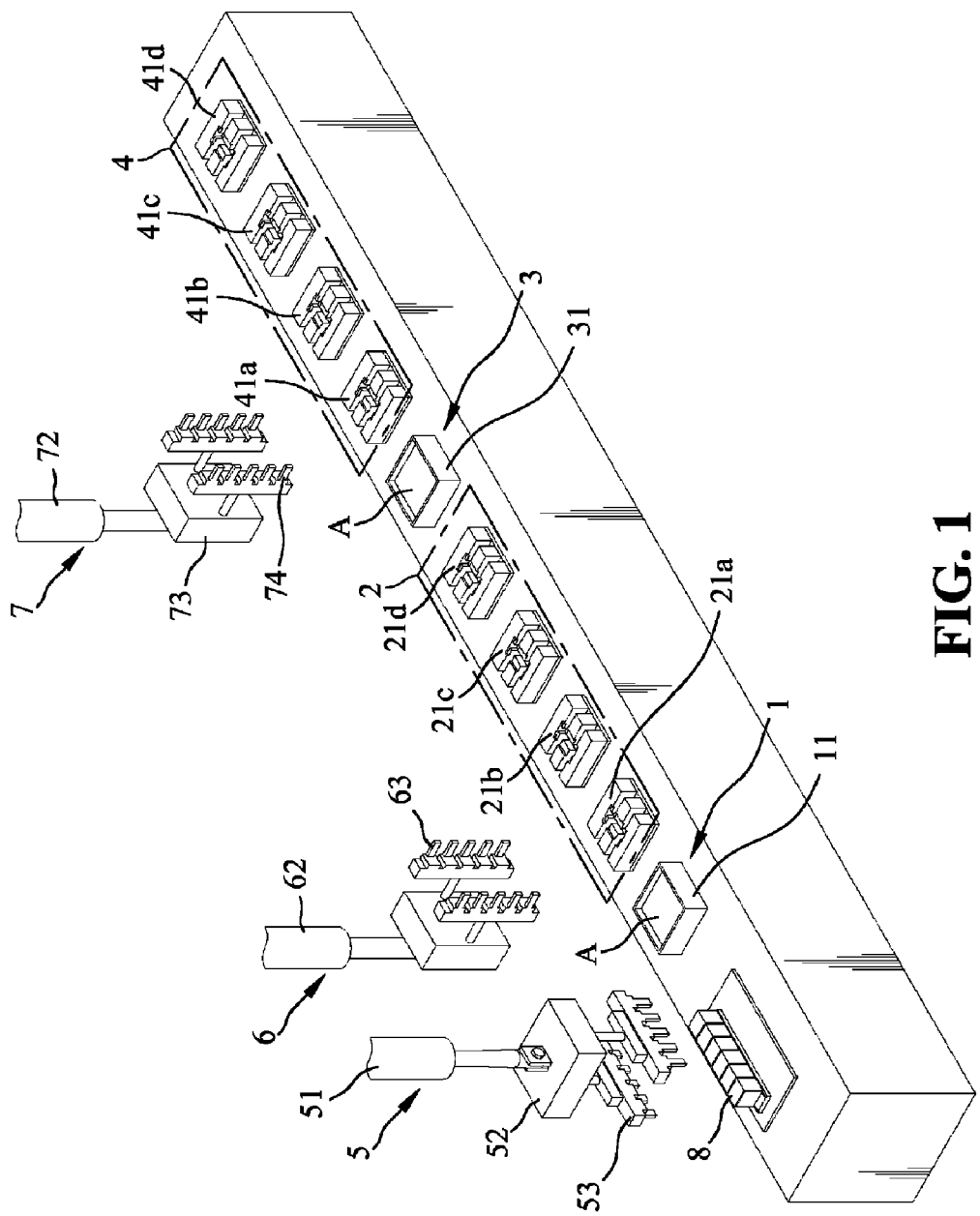
FIG. 1 shows the apparatus for forming the electrode heads in accordance with the present invention.

With reference to the drawings and in particular to FIG. 1, the installation device for electrode heads comprises a first area 1, a first electrode head forming area 2, a second area 3 and a second electrode head forming area 4. A first transfer unit 5 and a second transfer unit 6 are disposed between the first area 1 and the first electrode head forming area 2. A third transfer unit 7 is disposed between the first electrode head forming area 2 and the second electrode head forming area 4.

A first container 11 for receiving the wax "A" is located in the first area 1, and a second container 31 for receiving the wax "A" is located in the second area 3. In the first electrode head forming area 2, a post-processing process for forming the first electrode head after wax dipping in the first area 1 is carried out, and a plurality of first casting molds 21a to 21d, which are disposed in a row, are disposed in the first electrode head forming area 2. In the second electrode head forming area 4, a post-processing process for forming the second electrode head after wax dipping in the second area 3 is carried out, and a plurality of second casting molds 41a to 41d, which are disposed in a row, are disposed in the second electrode head forming area 4. The first casting molds 21a to 21d and the second casting molds 41a to 41d have automatic mold open and close mechanisms which are well known in the art.

Figure 2:
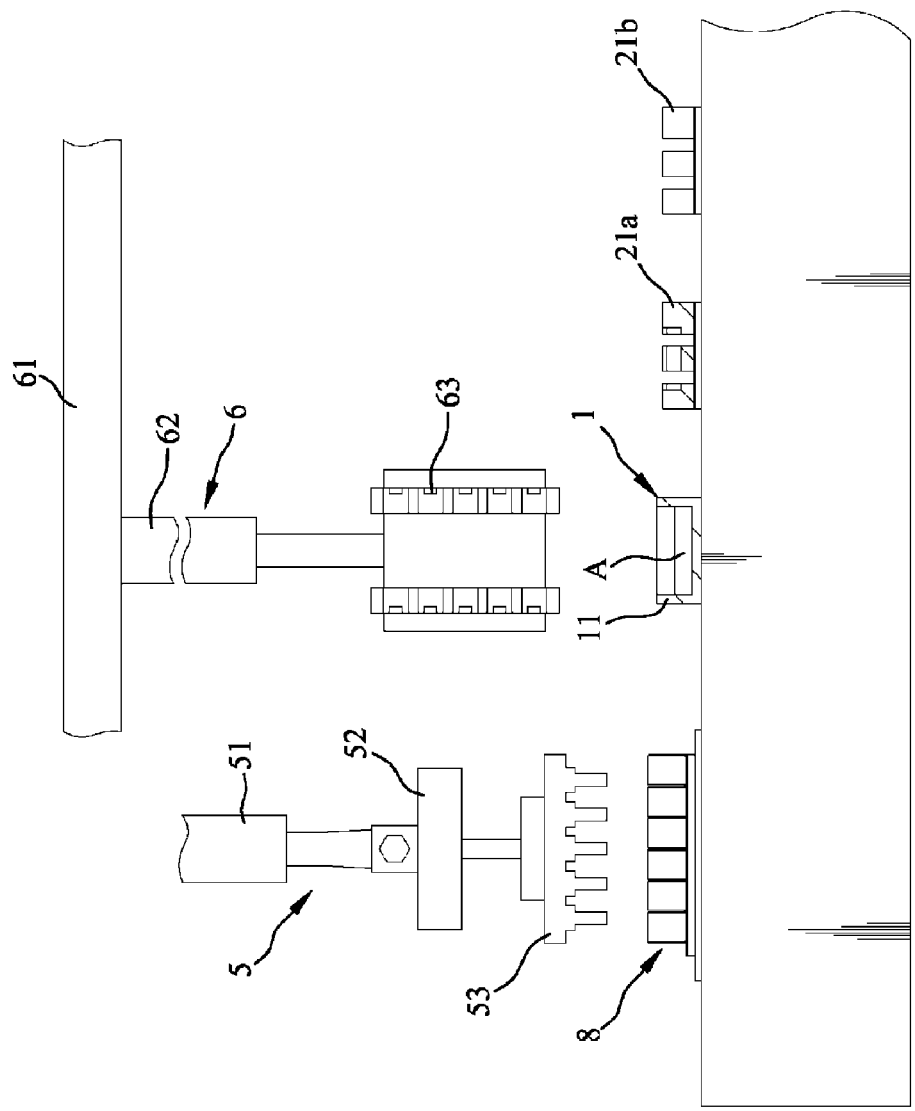
FIG. 2 shows that the first transfer unit is disposed above the horizontally positioned electrode plate group.
Figure 3:
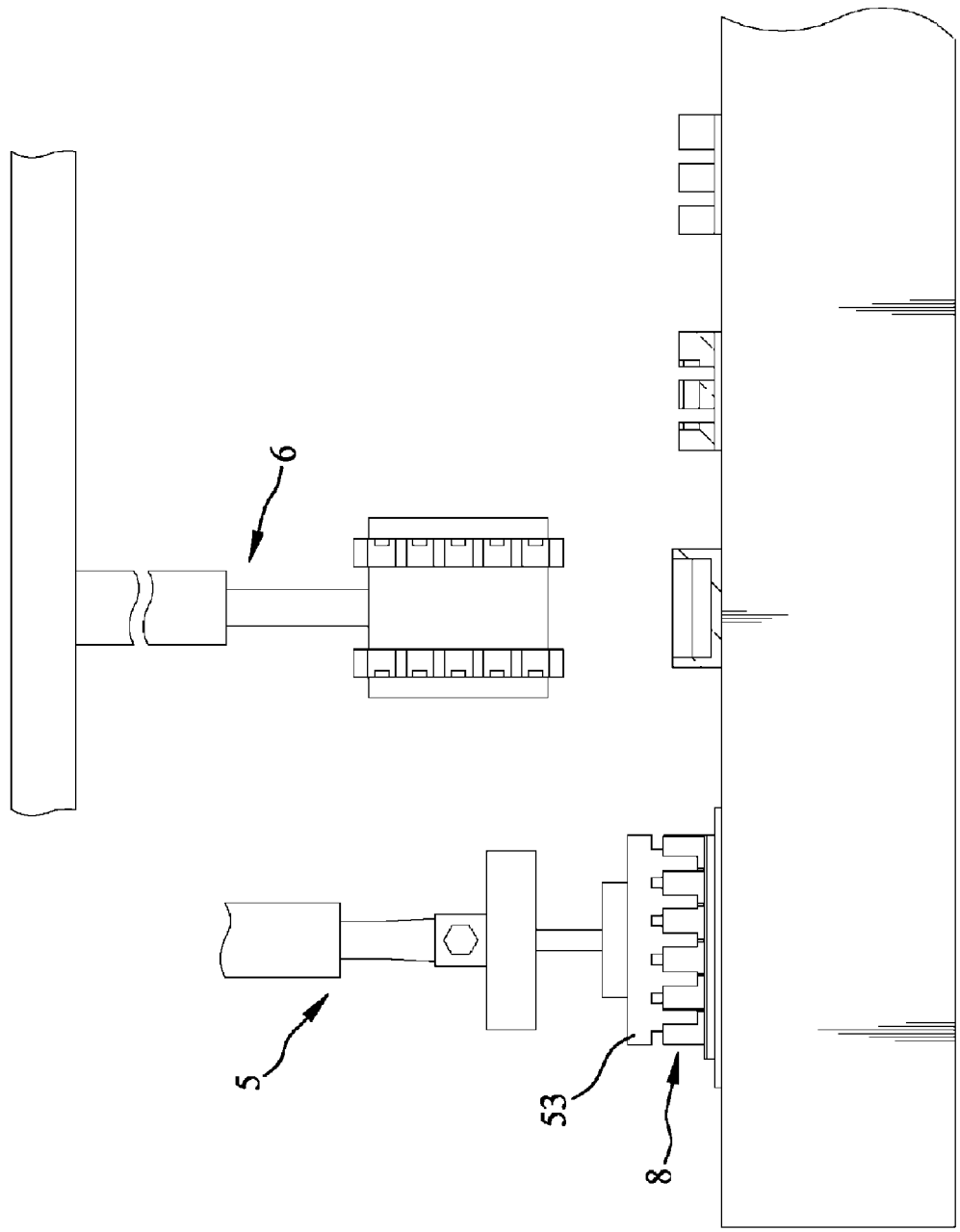
FIG. 3 shows that the first transfer unit is lowered, and the first clamper holds the horizontally positioned electrode plate group.
Figure 4:
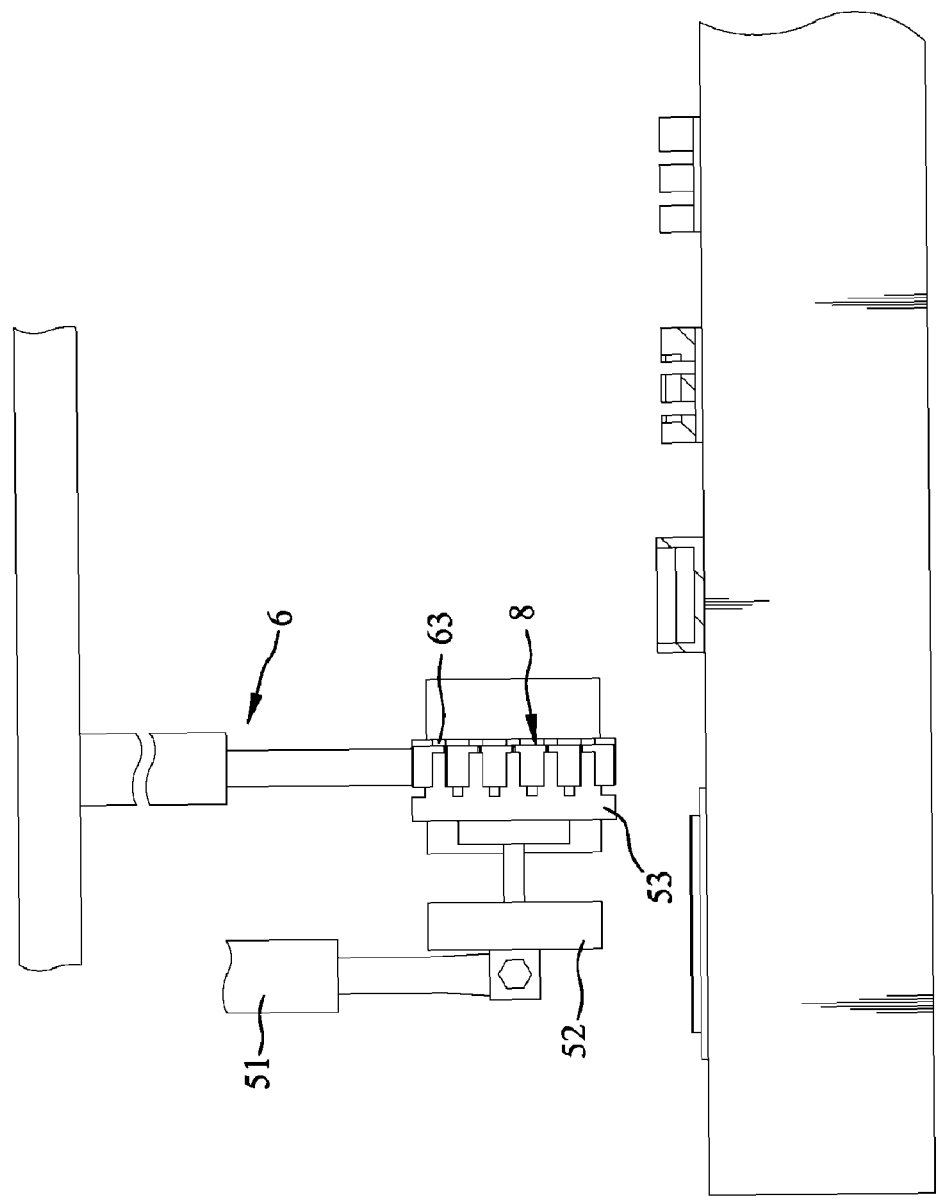
FIG. 4 shows that the first clamper holds the electrode plate group and turns the electrode plate group from the horizontal orientation to the vertical orientation.

As shown in FIGS. 2 to 4, a mechanical arm, or a pneumatic cylinder 51 used together with a rotary cylinder 52 and a first clamper 53 is utilized in the first transfer unit 5. The first clamper 53 can be controlled for holding or releasing, and the rotary cylinder 52 can turn the first clamper 53 around. When the pneumatic cylinder 51 or the mechanical arm is activated, the first clamper 53 can hold the electrode plate group 8 formed by stacking a plurality of electrode plates as shown in FIG. 3, and then the pneumatic cylinder 51 or the mechanical arm lift the electrode plate group 8 up to a proper height, followed by turning the electrode plate group 8 from the horizontal orientation to the vertical orientation using the rotary cylinder 52 as shown in FIG. 4. Then, the second transfer unit 6 holds the electrode plate group 8 oriented vertically, and delivered it to the first area 1.

Figure 5:
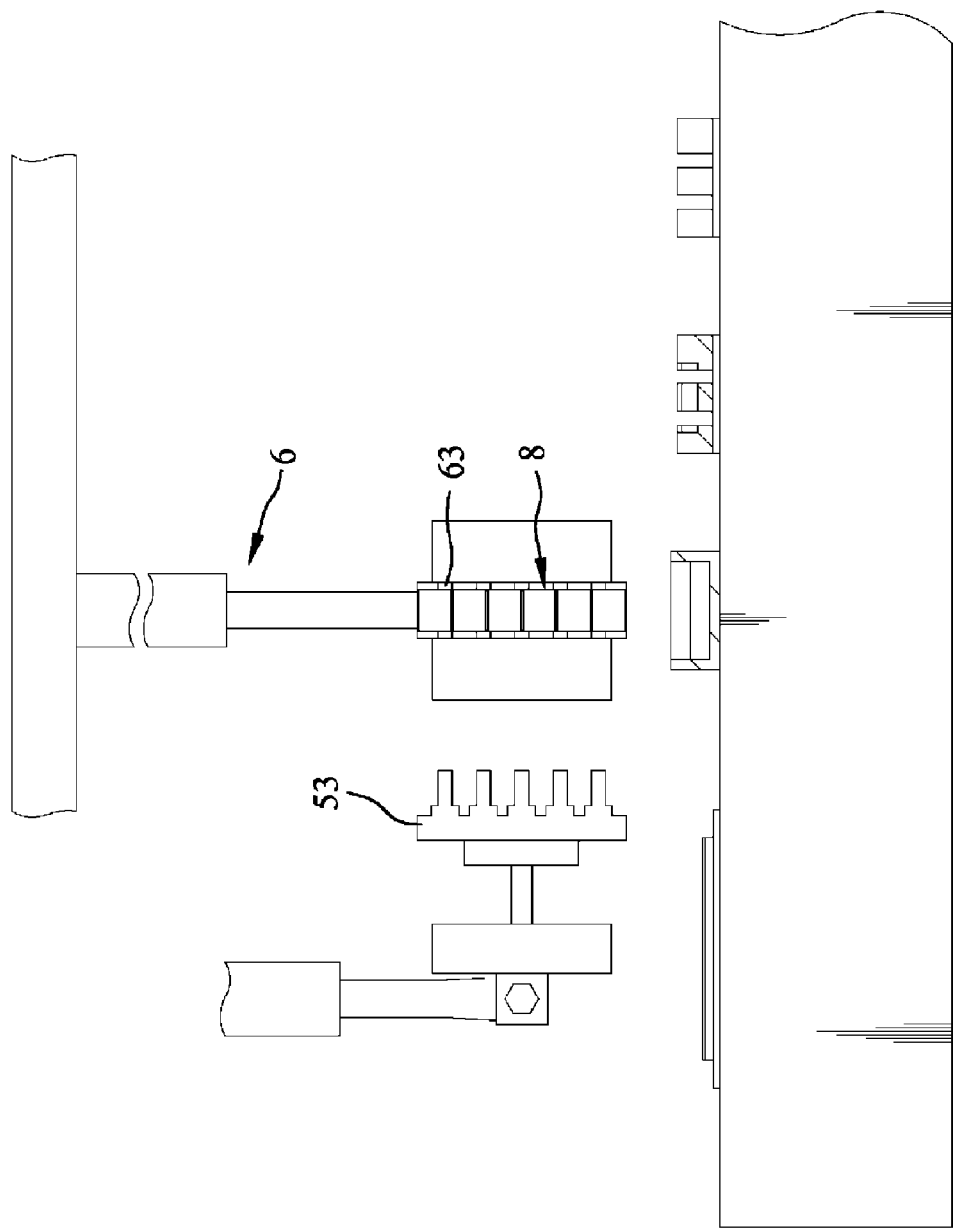
FIG. 5 shows that the second clamper of the second transfer unit holds the vertical electrode plate group, and delivers the electrode plate group to the first area.
Figure 6:
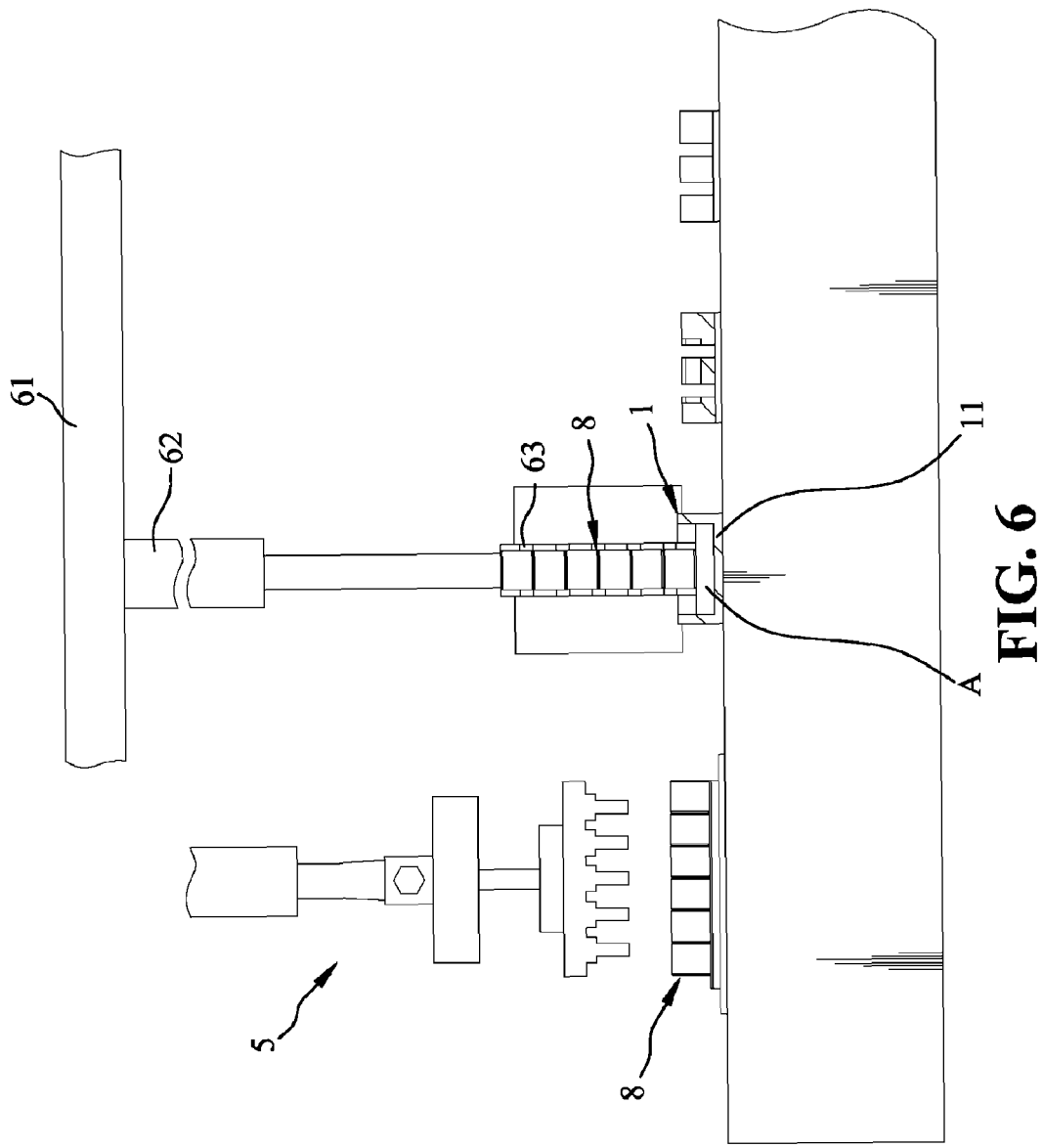
FIG. 6 shows that one end of the electrode plate group is dipped into the wax by the second transfer unit.
Figure 7:
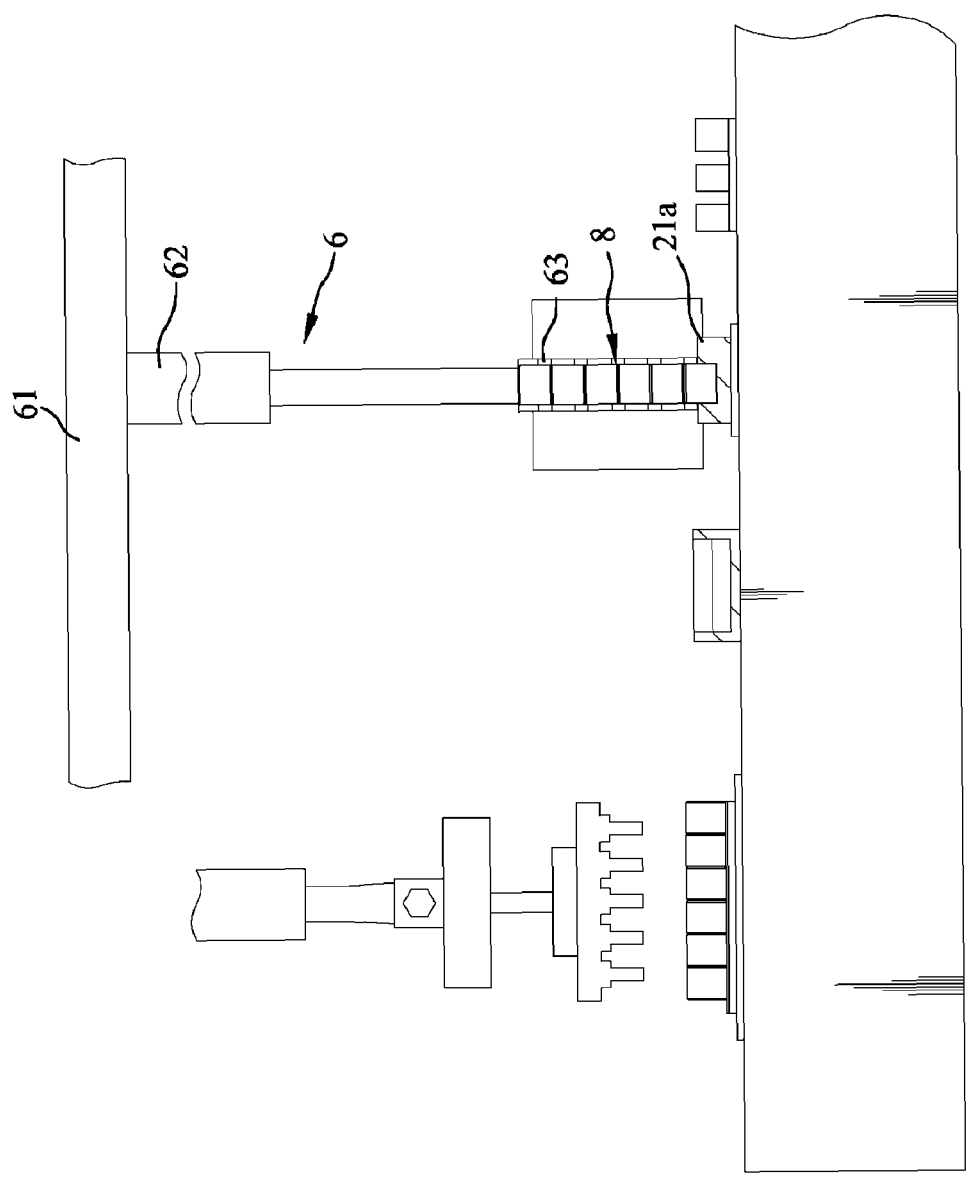
FIG. 7 shows that the wax dipped end of the electrode plate group enters one of the first casting molds by the second transfer unit.
Figure 8:
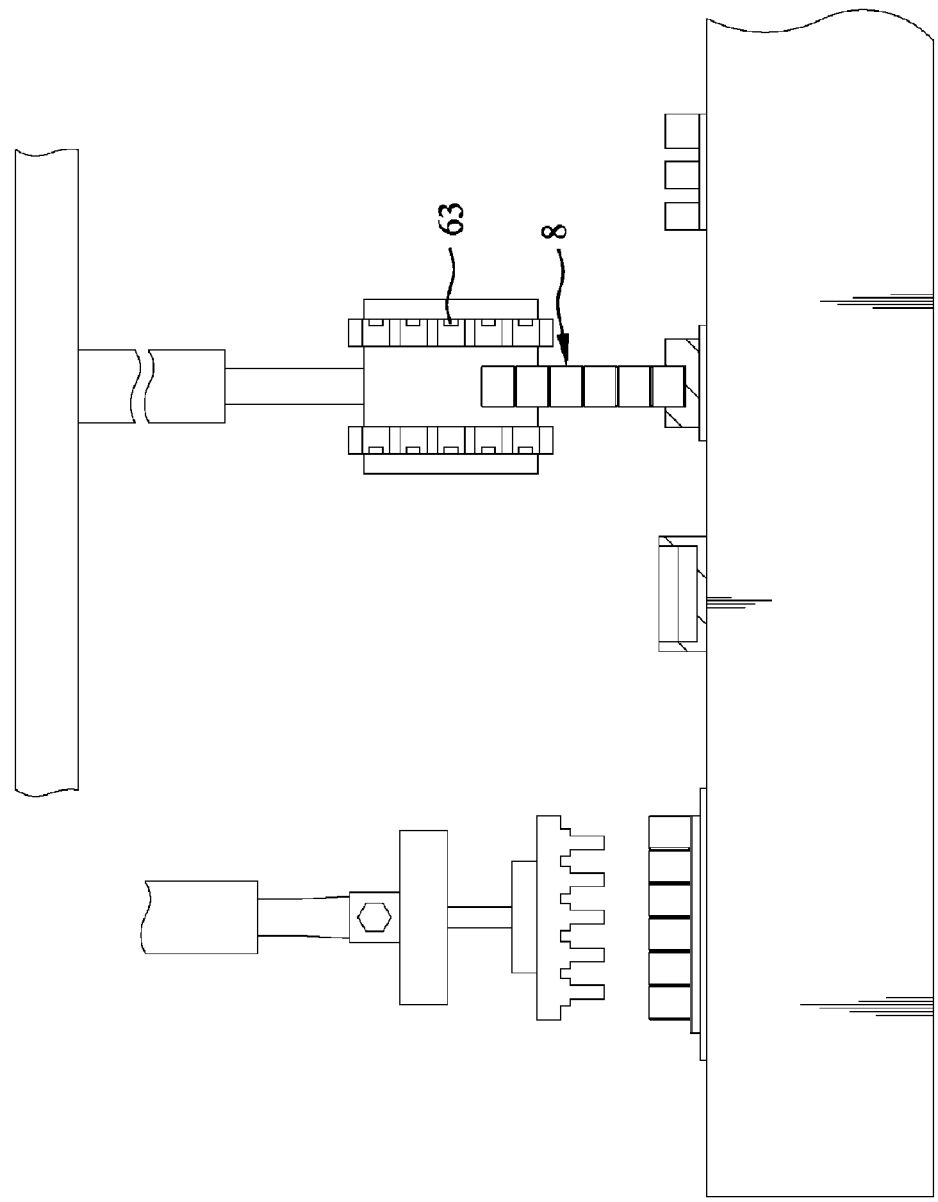
FIG. 8 shows that the second transfer unit releases the electrode plate group.
Figure 9:
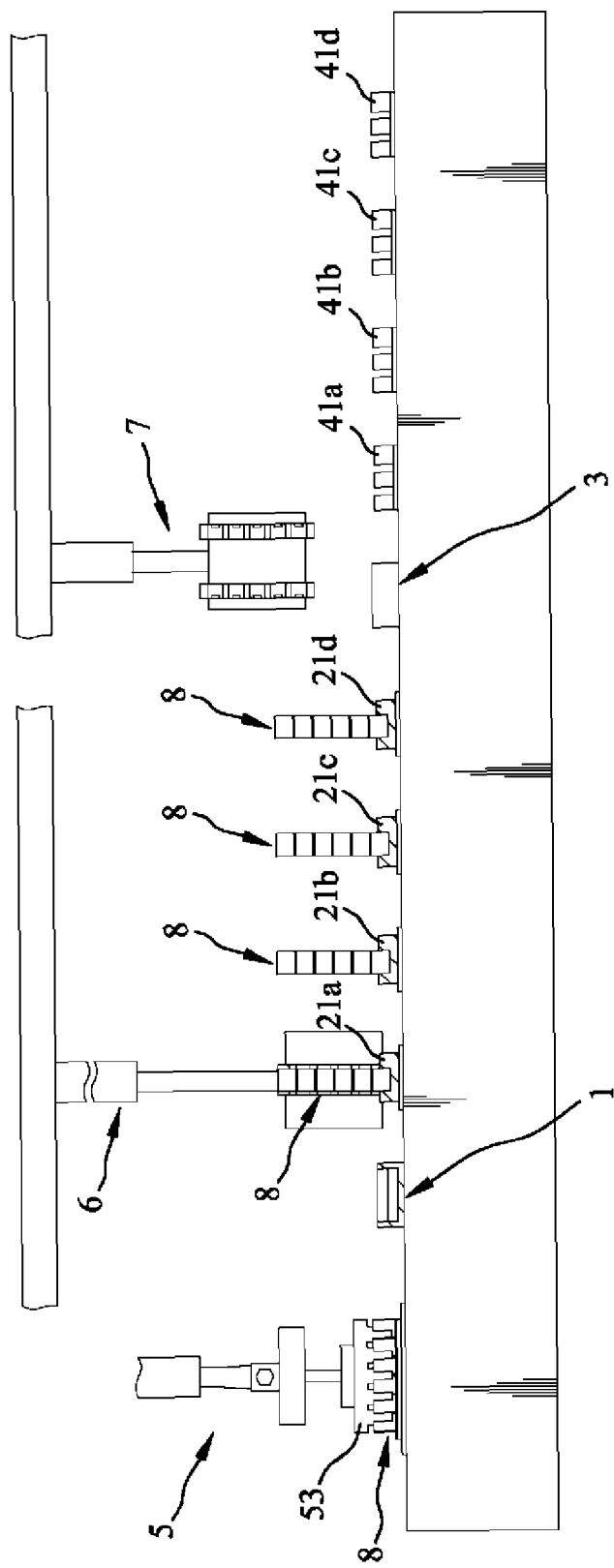
FIG. 9 shows that a plurality of the electrode plate groups enter the first casting molds, respectively, by the second transfer unit.

The second transfer unit 6 can be a mechanical arm or a track conveyor 61 used together with a pneumatic cylinder 62 and a second clamper 63. The second clamper 63 is controlled for holding or releasing. After turning the electrode plate group 8 from the horizontal orientation to the vertical orientation using the rotary cylinder 52 in the first transfer unit 5, the mechanical arm or the track conveyor 61 in the second transfer unit 6 drives the pneumatic cylinder 62 to a position close to the first transfer unit 5, and then the second pneumatic cylinder 62 lowers the second clamper 63 to hold the electrode plate group 8. The pneumatic cylinder 62 is then moved upward, and subsequently moved to a location above the first area 1 by the mechanical arm or the track conveyor 61 as shown in FIG. 5. The pneumatic cylinder 62 then lowers the electrode plate group 8 so that the lower end of the electrode plate group 8 is dipped with the wax "A" as shown in FIG. 6. The pneumatic cylinder 62 is then lifted the electrode plate group 8 upward, and moves it to a location above the first casting mold 21a in the first electrode head forming area 2, and then the pneumatic cylinder 62 lowers the electrode plate group 8 so that the lower end of the electrode plate group 8 enters the first casting mold 21a which is opened up as shown in FIG. 7. The first casting mold 21a is then closed off, and the first electrode head 81 is formed on the lower end of the electrode plate group 8 by casting as shown in FIG. 8. During the period of waiting for forming the electrode head, the above-mentioned transfer process is repeated by the first and second transfer units 5, 6 so as to transfer the other electrode plate groups 8 to the first casting molds 21b to 21d, respectively as shown in FIG. 9.

Figure 10:
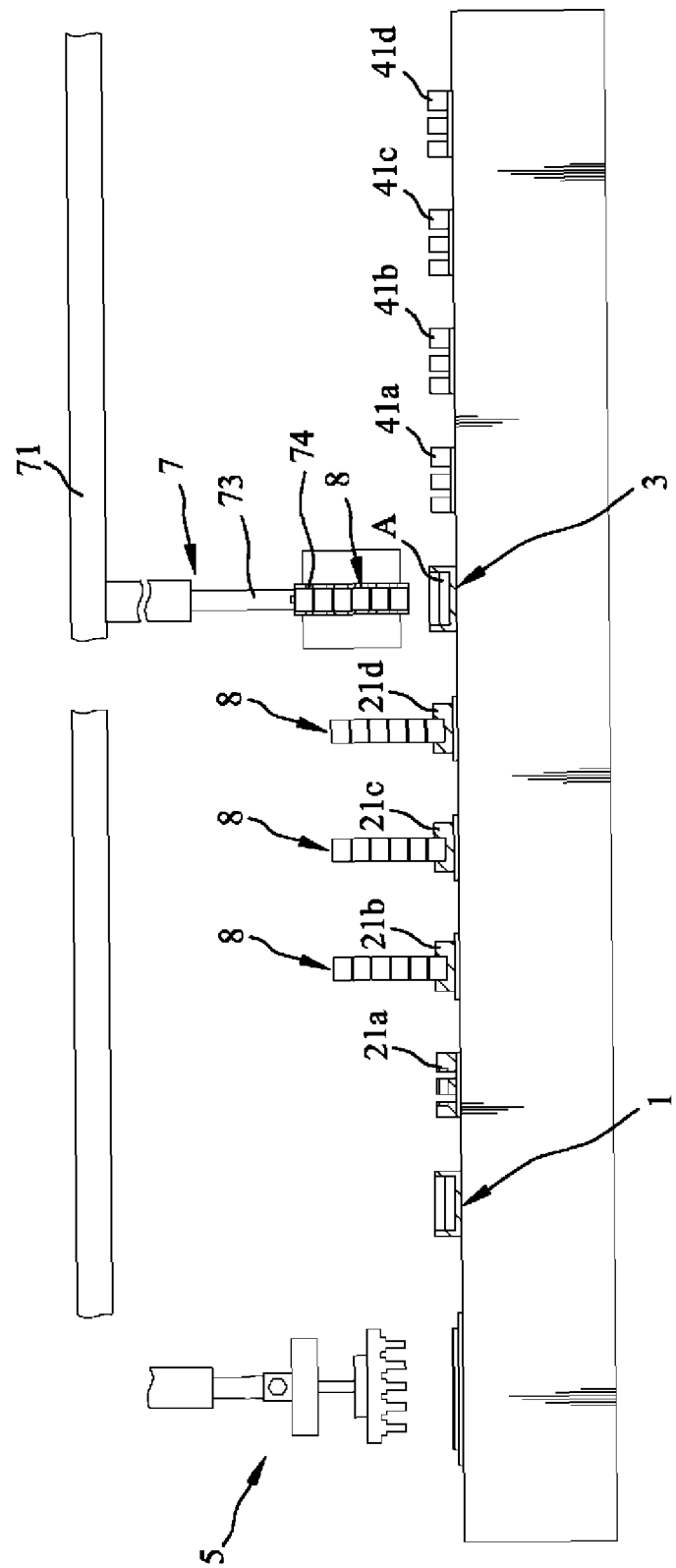
FIG. 10 shows that the third transfer unit delivers the electrode plate group with the first electrode head formed thereon to the second area.
Figure 11:
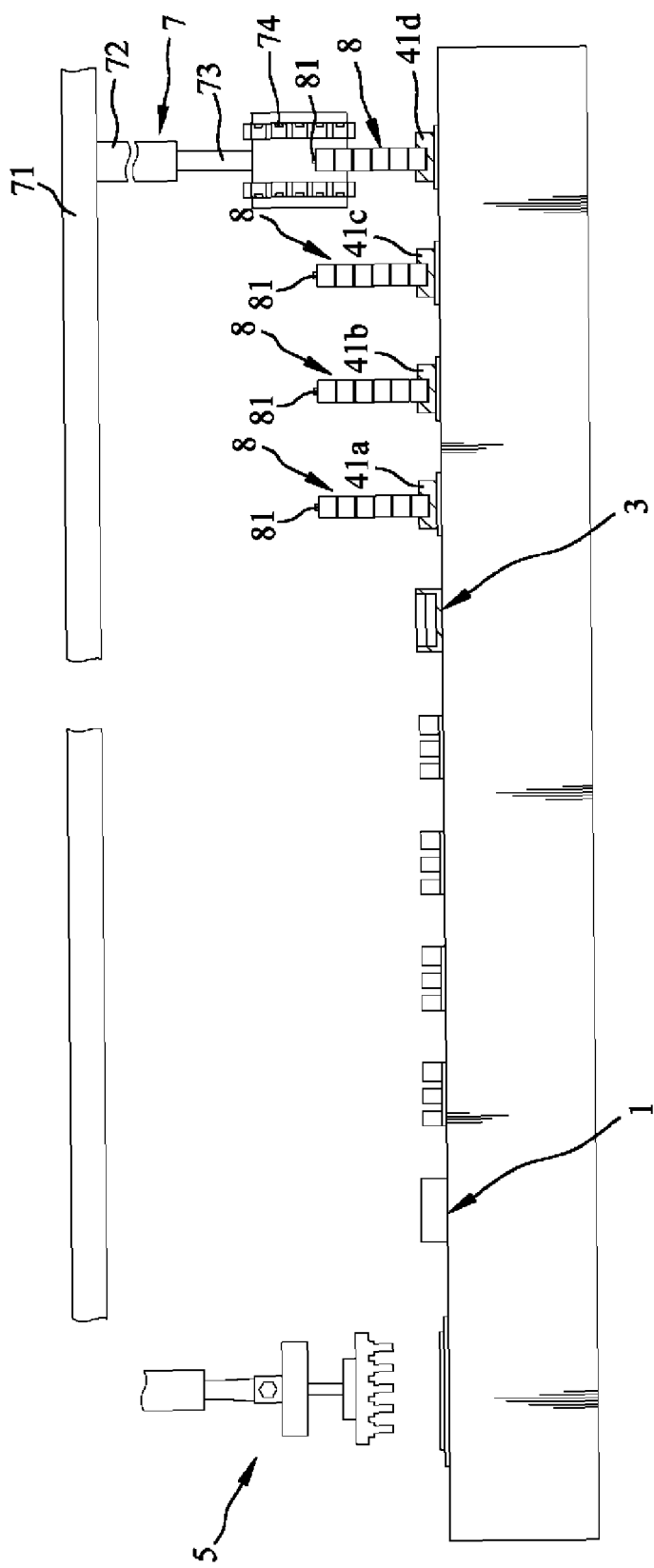
FIG. 11 shows that a plurality of the electrode plate groups enter the second casting molds, respectively, by the third transfer unit.
Figure 12:
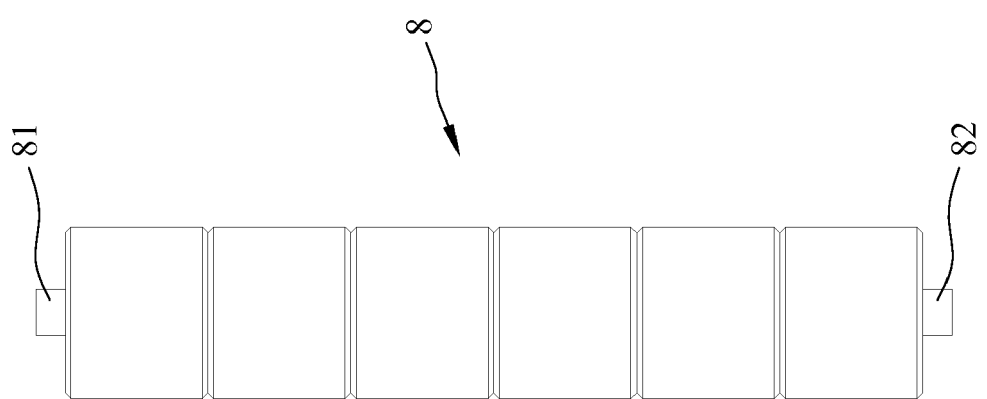
FIG. 12 shows that the first and second electrode heads are formed on the two ends of the electrode plate group, respectively.

After the first electrode head 81 is formed on the first end of the electrode plate group 8 in the first electrode head forming area 2, the third transfer unit 7 takes out the electrode plate group 8 from the first casting molds 21a to 21d, and delivers the electrode plate group 8 to the second electrode heads forming area 4. The electrode plate group 8 are then rotated 180 degrees to turn its second end up side down. The second end of the electrode plate group 8 is then dipped with the wax "A" in the second area 3 as shown in FIG. 10 and then enters the second casting molds 41a to 41d, and the casting process is performed to form the second electrode heads 82 on the second end of the electrode plate group 8 as shown in FIG. 11. FIG. 12 shows that the first and second electrode heads 81, 82 are respectively formed on the two ends of the electrode plate group 8 by the casting.

The third transfer unit 7 can be a mechanical arm, or a track conveyor 71 used together with a pneumatic cylinder 72, a rotary cylinder 73, and a third clamper 74. The third clamper 74 is controlled by the rotary cylinder 73 to perform rotation and the way of operation and functions are the same as those of the first transfer unit 5.

Although the present invention has been described with reference to the preferred embodiment thereof, it is apparent to those skilled in the art that a variety of modifications and changes may be made without departing from the scope of the present invention which is intended to be defined by the appended claims.

What is claimed is:
1. An apparatus for forming electrode heads, comprising:
a first area provided with a first container containing wax;
a first electrode head forming area provided with a plurality of first casting molds, and provided following the first area to perform a post-processing process to an electrode plate group from the first area;
a second area provided with a second container containing wax;
a second electrode head forming area provided with a plurality of second casting molds, and provided following the second area to perform a post-processing process to the electrode plate group from the second area;
a first transfer unit provided with a first clamper which holds the electrode plate group and turns the electrode plate group around;
a second transfer unit provided with a second clamper, and delivering the turned electrode plate group from the first transfer unit to the first area to dip the wax, the electrode plate group dipped with the wax being delivered to the first electrode head forming area and entering one of the first casting molds to form a first electrode head on the electrode plate group, and
a third transfer unit provided with a third clamper which holds the electrode plate group with the first electrode head formed thereon and turns the electrode plate group with the first electrode head formed thereon around, the third transfer unit delivering the electrode plate group with the first electrode head formed thereon to the second area to dip the wax, the wax dipped electrode plate group with the first electrode head formed thereon being delivered to the second electrode head forming area and entering one of the second casting molds to form a second electrode head on the electrode plate group with the first electrode head formed thereon.

* * * * *